(12) United States Patent
Ren

(10) Patent No.: US 7,920,578 B2
(45) Date of Patent: Apr. 5, 2011

(54) SYSTEM AND METHOD FOR MONITORING A VIDEO PHONE SERVICE

(75) Inventor: Yijun Ren, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 725 days.

(21) Appl. No.: 11/765,229

(22) Filed: Jun. 19, 2007

(65) Prior Publication Data

US 2007/0268361 A1 Nov. 22, 2007

Related U.S. Application Data

(63) Continuation of application No. PCT/CN2006/001676, filed on Jul. 14, 2006.

(30) Foreign Application Priority Data

Jul. 14, 2005 (CN) .......................... 2005 1 0036026

(51) Int. Cl.
*H04L 12/66* (2006.01)
*H04L 12/26* (2006.01)

(52) U.S. Cl. ........................................ 370/401; 370/390

(58) Field of Classification Search .................. None
See application file for complete search history.

(56) References Cited

U.S. PATENT DOCUMENTS

| | | | |
|---|---|---|---|
| 6,654,589 B1 * | 11/2003 | Haumont | 455/67.11 |
| 7,286,652 B1 * | 10/2007 | Azriel et al. | 379/88.22 |
| 7,620,389 B2 * | 11/2009 | Kallio et al. | 455/414.1 |
| 2002/0124262 A1 * | 9/2002 | Basso et al. | 725/109 |
| 2003/0026274 A1 * | 2/2003 | Droz | 370/410 |
| 2003/0131353 A1 * | 7/2003 | Blom et al. | 725/25 |
| 2003/0174695 A1 | 9/2003 | Lautenschlager et al. | |
| 2003/0179747 A1 * | 9/2003 | Pyke et al. | 370/389 |
| 2003/0185544 A1 * | 10/2003 | Azuma | 386/80 |
| 2003/0200311 A1 * | 10/2003 | Baum | 709/224 |

(Continued)

FOREIGN PATENT DOCUMENTS

CN 1445967 10/2003

(Continued)

OTHER PUBLICATIONS

Handley, M et al. "SDP: Session Description Protocol". RFC 2327. IETF. Apr. 1998. pp. 1-8.*

(Continued)

*Primary Examiner* — Daniel J Ryman
*Assistant Examiner* — Michael Fialkowski
(74) *Attorney, Agent, or Firm* — Leydig, Voit & Mayer, Ltd.

(57) ABSTRACT

A system and a method for monitoring a Video Phone (VP) service monitors a video communication between a calling video terminal and a called video terminal, and the system including a Mobile Switching Center (MSC) server, a Media GateWay (MGW), a Video Inter-working Gateway (VIG), and a monitoring receiving unit. When the calling video terminal initiates a VP call to the called video terminal, the MSC server instructs the MGW to duplicate the call data of the calling and called video terminal, transmits the call data to the VIG, and instructs the VIG to de-multiplexes the call data of calling video terminal and called video terminal into the audio flow and video flow. The VIG transmits the audio flow and video flow to the monitoring receiving unit for playing.

7 Claims, 7 Drawing Sheets

U.S. PATENT DOCUMENTS

| | | | |
|---|---|---|---|
| 2004/0202295 A1* | 10/2004 | Shen et al. | 379/112.01 |
| 2004/0246332 A1* | 12/2004 | Crouch | 348/14.08 |
| 2005/0094651 A1 | 5/2005 | Lutz et al. | |
| 2006/0264200 A1 | 11/2006 | Laiho et al. | |

FOREIGN PATENT DOCUMENTS

| | | |
|---|---|---|
| CN | 1509015 | 6/2004 |
| EP | 1 528 774 A1 | 5/2005 |
| WO | WO 2004/091250 A1 | 10/2004 |
| WO | WO 2005/025133 A1 | 3/2005 |

OTHER PUBLICATIONS

First Chinese Office Action from the Chinese Patent Office in corresponding Chinese Patent Application No. 2006800119334 (Oct. 17, 2008).

3GPP TS 33.107-Lawful Interception Architecture and Functions (Release 10), Jun. 2010, V.10.0.0, $3^{rd}$ Generation Partnership Project, Valbonne, France.

"3GPP TS 33.106-Lawful Interception Requirements (Release 10)," Jun. 2010, $3^{rd}$ Generation Partnership Project, Valbonne, France.

Schulzrinne, H., "RFC2326-Real Time Streaming Protocol," Apr. 1998, The Internet Society-Network Working Group, Geneva, Switzerland.

First Russian Office Action from the Russian Patent Office in corresponding Russian Patent Application No. 2007125542 (Sep. 16, 2008).

Written Opinion from the International Searching Authority in corresponding PCT Patent Application No. PCT/CN2006/001676 (Nov. 2, 2006).

* cited by examiner

SYSTEM AND METHOD FOR MONITORING A VIDEO PHONE SERVICE

This application is a continuation of International Patent Application No. PCT/CN2006/001676, filed Jul. 14, 2006, which claims priority to Chinese Patent Application No. 200510036026.2, filed Jul. 14, 2005, all of which are hereby incorporated by reference.

FIELD OF THE INVENTION

The present invention relates to video tracing techniques in the mobile communication field, and more particularly, to a system and method for monitoring or intercepting a video phone service.

BACKGROUND OF THE INVENTION

The Video Phone (VP) service is defined in 3G as a data service based on 64 k Unrestricted Data Information (UDI). It enables both parties of a call to see pictures shot by the video camera of the opposite terminal. The 64 k data service multiplexes video data, audio data, and control data. Each type of information occupies one logical channel, that is, the video data occupies video logical channel, the audio data occupies audio logical channel, and the control data occupies control logical channel.

Monitoring is a means provided for national security persons including policemen, army men, and the persons working in national security department, which enables these persons, if they know the telephone numbers used by criminals or suspects in advance, to notify the exchange of these numbers so as to obtain the communication content of the monitored number. In this way, security persons can know the status of criminals or suspects when the criminals or suspects dial a call or do other things, such as transmitting and/or receiving short message, turning on the phone, turning off the phone or updating location.

The existing monitoring is based on the voice. When the criminals or suspects are making a call, the exchange transmits the audio data duplicated during the call to the monitoring centre. Generally, the contents of the call are transmitted to a phone of a designated telephone number.

Since the monitoring is significant to national security, it has been used by many countries currently as one of the requirements for an exchange accessing a network. For the national security persons, they are not satisfied with simple voice monitoring. Especially with the increasing pervasiveness of VP, the opportunity of criminals and the like using VP is greatly increased. Therefore, video monitoring is in urgent need, which monitors the pictures shot by the video camera of the opposite terminal during the call to further obtain more visual information, such as geographical location, picture of person, and so on, in which the security persons are more interested.

SUMMARY OF THE INVENTION

The embodiments of the present invention provide a system and method for monitoring VPs.

A system for monitoring a VP service, applied for monitoring a video communication between a calling video terminal and a called video terminal, includes a Mobile Switching Centre (MSC) server, a Media GateWay (MGW), a Video Inter-working Gateway (VIG), and a monitoring receiving unit;

wherein the MSC server sends a call to the VIG upon the calling video terminal initiating a VP call to the called video terminal and instructs the MGW to duplicate call data of the calling video terminal and the called video terminal;

the MGW duplicates the call data of the calling video terminal and the called video terminal, respectively, and transmits the call data to the VIG;

the VIG receives the call sent by the MSC server, establishes a connection with the MGW, and receives the call data;

the VIG de-multiplexes the call data into an audio flow and a video flow, and transmits the audio flow, the video flow, and a control signaling to the monitoring receiving unit; and the monitoring receiving unit plays the audio flow and video flow according to the control signalling.

A method for monitoring a VP service, applied for monitoring a video communication between a calling video terminal and a called video terminal, includes the following steps:

duplicating call data of the calling video terminal and the called video terminal when a VP call is initiated by the calling video terminal to the called video terminal;

de-multiplexing the call data into an audio flow and a video flow;

playing the audio flow and the video flow at a monitoring receiving end.

It can be seen from the above mentioned schemes that upon de-multiplexing the call data into an audio flow and a video flow on the VIG, the MGW duplicates the call data of the monitored subscriber and transmits the call data to the monitoring receiving end, which makes up the vacancy of video monitoring in the prior art.

EMBODIMENTS OF THE INVENTION

A detailed description of the present invention is hereinafter given with reference to specific embodiments and the accompanying drawings.

According to the embodiments of the present invention, when a terminal initiates a VP call-, an MSC server instructs an MGW to duplicate the call data between the terminals, and instructs a VIG to receive the call data duplicated by the MGW. Upon de-multiplexing the call data to an audio flow and video flow, the VIG transmits the audio flow and video flow to the monitoring receiving unit.

A First Embodiment

Figure 1A:
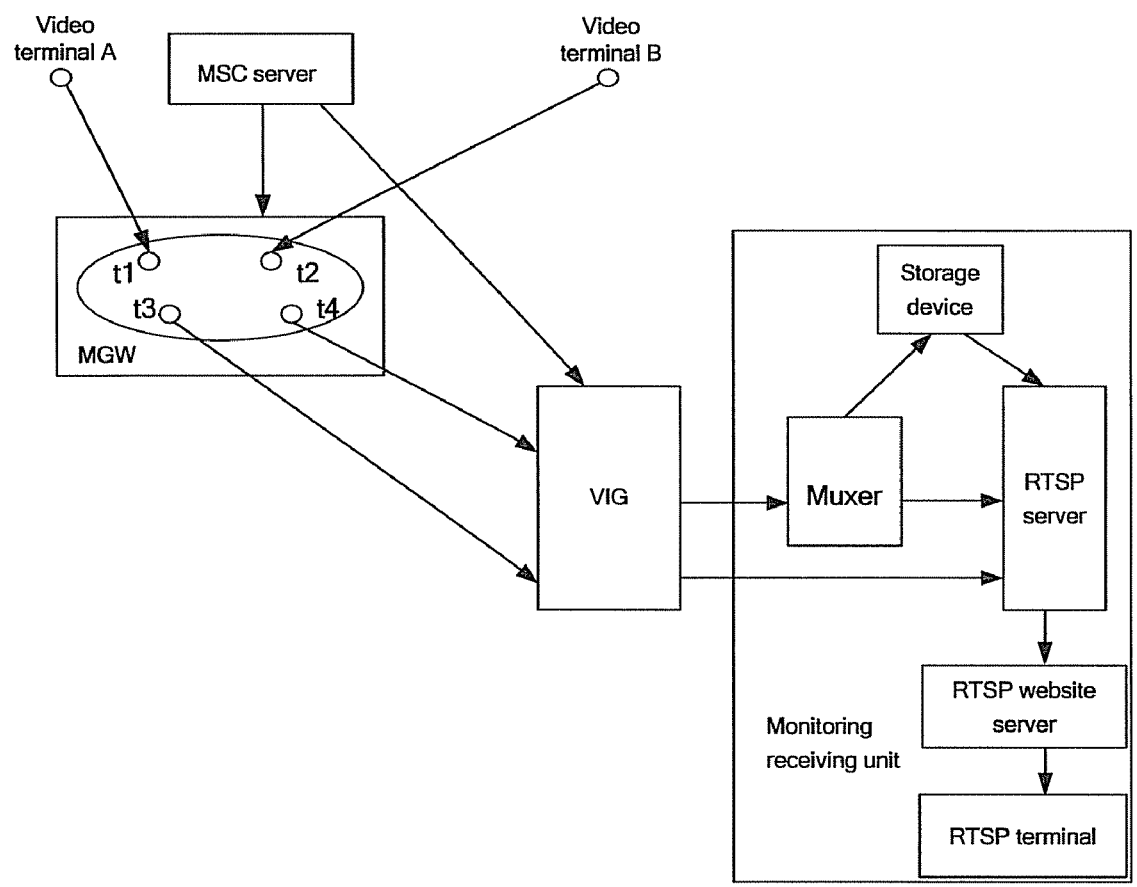
FIG. 1a is a schematic diagram illustrating architecture of a system for monitoring VPs in accordance with a first embodiment of the present invention.

FIG. 1a is a schematic diagram illustrating architecture of a system for monitoring VPs in accordance with the first embodiment of the present invention. As shown in FIG. 1a, in the first embodiment, the system for monitoring VPs includes a video terminal A, a video terminal B, an MSC server, an MGW, a VIG, a real time streaming protocol (RTSP) server, a Muxer, a storage device, an RTSP website server, and an RTSP terminal. These network entities will be described hereinafter, respectively.

(1) the video terminal A and video terminal B have the Multi-media communication function.

(2) the MSC server, as a control plane, stores the phone number of the monitored subscriber. wherein the phone number can be set by the monitoring centre. When the monitored subscriber dials or receives a call, the MSC server instructs the MGW to duplicate call data on the bearer plane, and initiates a call to the VIG notifying the VIG to receive the channel information of the call data duplicated by the MGW. In this embodiment, the MSC server can be the MSC server where the video terminal A belongs. It should be understood that the MSC server can be the MSC server where the video terminal B belongs as well.

(3) under the control of MSC server, the MGW, as the bearer plane, duplicates uplink and downlink VP call data of the monitored subscriber and forwards the call data to the VIG. Specifically, if the calling party is the monitored subscriber, then the uplink and downlink call data of calling party are duplicated. The downlink call data of the calling party is the uplink call data of the called party, therefore the data to be duplicated are the uplink call data of the calling party and the uplink call data of the called party. If the called party is the monitored subscriber, then the uplink and downlink call data of called party is duplicated. The downlink call data of the called party is the uplink call data of the calling party, therefore the data to be duplicated is still the uplink call data of called party and the uplink call data of calling party. It can be seen from the above that, whether the calling party or the called party is the monitored subscriber, the data to be duplicated are the same, which includes the uplink call data of calling party and the uplink call data of called party.

(4) the VIG establishes a connection with the MGW according to the call sent by the MSC server, processes the call data from the MGW on the bearer plane, de-multiplexes the audio flow and video flow, converts the two flows to the Real-time Transport Protocol (RTP) flow, and transmits the RTP flow to the RTSP server via the Muxer. On the control plane, the VIG transmits a control signalling including information of RTP flow address and encoding/decoding information through the RTSP protocol to the RTSP server. The VIG has a function of making and updating a PORTAL page. Once receiving the call, the VIG updates the monitoring interface, such as the PORTAL page, to list the number of the monitored subscriber on the PORTAL page.

(5) the Muxer forwards the received RTP flow to the RTSP server, converts the RTP flow to a file in a stream media format, and stores the RTP flow in the storage device. The RTSP server can read the stored file in stream media format. The solution in accordance with the embodiment of the present invention may not include a Muxer, and in such case, the VIG will transmit the RTP flow to the RTSP server directly.

(6) the RTSP server uses the received RTP flow forwarded by the Muxer as a program live-play source and broadcasts it through the network. The RTSP server may also use the file in stream media format stored by the storage device as a live-play source and broadcast it through the network.

(7) the RTSP website server receives the RTP flow broadcasted by the RTSP server and associates the RTP flow with the monitoring interface, i.e. the number of the monitored subscriber displayed on the PORTAL page.

(8) the RTSP terminal accesses the PORTAL page of the RTSP website server through a browser, click the monitored subscriber's phone number and carry out real-time video monitoring or access the stored monitored object's video file.

The above-mentioned Muxer, storage device, RTSP server, RTSP website server, and RTSP terminal belong to the monitoring receiving unit. The work completed by them is to restore the monitored audio and video data of the monitored subscriber, and is to play such data.

The above Muxer, storage device, and RTSP server can be located in one physical entity. Or, the Muxer can be located in the same physical entity with the VIG. If the Muxer and the RTSP server are not located in one physical entity, shared network protocols should be used simultaneously in the RTSP server and the Muxer, so the Muxer can forward the RTP flow to the RTSP server or transmit the file in stream media format stored by the Muxer to the RTSP server in time.

Figure 1B:
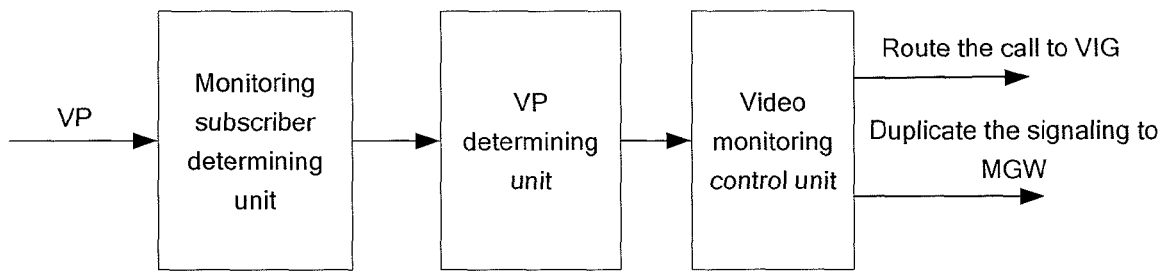
FIG. 1b is a schematic diagram illustrating architecture of an MSC server in accordance with the first embodiment of the present invention.

FIG. 1b is a schematic diagram illustrating architecture of an MSC server in accordance with the first embodiment of the present invention. As shown in FIG. 1b, the part associated with video monitoring in the MSC server in accordance with the first embodiment includes a monitoring subscriber determining unit, a VP identifying unit, and a video monitoring control unit. When receiving a call from a terminal subscriber, the monitoring subscriber determining unit determines whether the number of the calling video terminal or the number of the called video terminal of the call is the phone number of the monitored subscriber. If the number of the calling video terminal or the number of the called video terminal of the call is the phone number of the monitored subscriber, the call is intercepted and is routed to the VP identifying unit. Otherwise, the call is routed to a unit for processing the normal call. When receiving the call routed by the monitoring subscriber determining unit, the VP identifying unit decides whether the call is a VP call according to whether the call includes a 64 k UDI. If the call includes the 64 k UDI, it means that the call is a VP call and then the VP is routed to the video monitoring control unit. Otherwise, the call is routed to a processing unit for monitoring an audio phone. When receiving the VP call routed from the VP identifying unit, the video monitoring control unit performs the following processes. Two calls are respectively sent to the VIG for instructing the VIG to establish a connection with the MGW, wherein one of the two calls includes an initial address message (IAM) including the number of the calling video terminal, and the other call includes an IAM message including the number of the called video terminal. Then a duplicating instruction signalling is sent to the MGW instructing the MGW to duplicate the data of the two calls respectively.

Figure 1C:
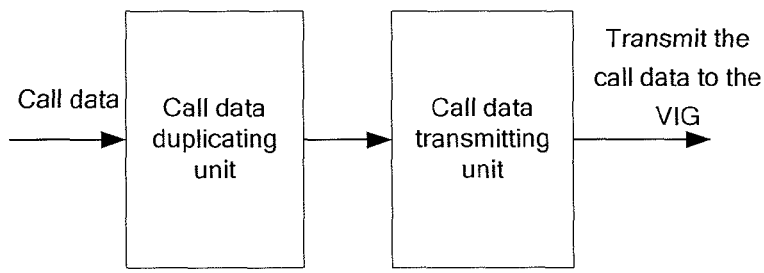
FIG. 1c is a schematic diagram illustrating a structure of an MGW in accordance with the first embodiment of the present invention.

FIG. 1c is a schematic diagram illustrating the structure of the MGW in accordance with the first embodiment of the present invention. As shown in FIG. 1c, the part associated with video monitoring in the MGW includes a call data duplicating unit and a call data transmitting unit. Under an instruction of the MSC server, the call data duplicating unit respectively duplicates the uplink call data of the calling party and the called party and then transmits the uplink call data of the calling party and the called party to the call data transmitting unit. The call data transmitting unit transmits the uplink phone data of the calling party and the called party to the VIG.

Figure 1D:
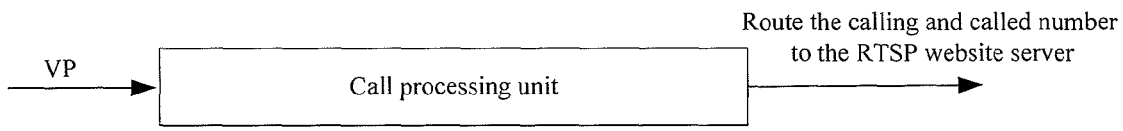
FIG. 1d is a schematic diagram illustrating a structure of the VIG in accordance with the first embodiment of the present invention.
Figure 1D:
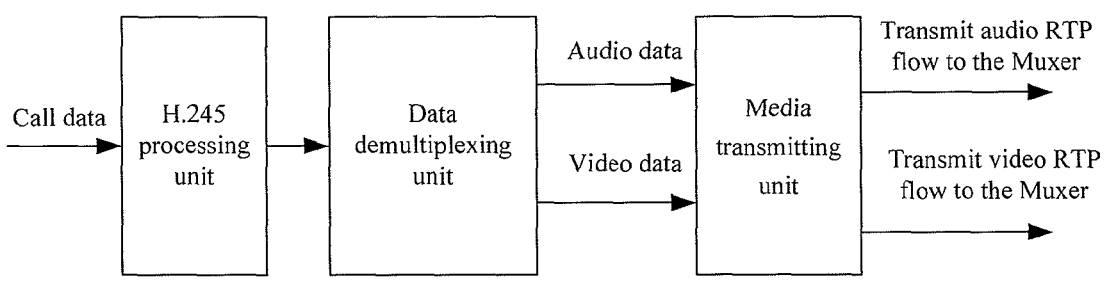

FIG. 1d is a schematic diagram illustrating the structure of the VIG in accordance with the first embodiment of the present invention. As shown in FIG. 1d, the part associated with video monitoring in the VIG includes a call processing unit, an H.245 processing unit, a data de-multiplexing unit, and a media transmitting unit. When the call processing unit receives a call from the MSC server, the call processing unit transmits the number of the calling video terminal and the number of the called video terminal to an RTSP website server. Alternatively, when the call processing unit receives a call from the MSC server, the call processing unit transmits the number of the calling video terminal or the number of the called video terminal, i.e. the phone number of the monitored subscriber, to the RTSP website server. The H.245 processing unit terminates an H.245 negotiation contained in the uplink call data of the calling party and the called party, respectively, and then transmits the uplink call data of the calling party and the called party to the call processing unit. The data de-multiplexing unit duplicates a video open logic channel (OLC) message in the uplink call data of the calling party to the uplink data of the called party. And the data de-multiplexing unit de-multiplexes the audio flow and video flow from the call data, such as the H.233 flow, according to an audio OLC message and the video OLC message in the uplink call data of the calling party and the called party, and transmits the audio flow and video flow to the media transmitting unit. The media transmitting unit converts the audio flow and the video flow to RTP flows and transmits the converted flows to the monitoring receiving unit. In this embodiment, the converted flows are transmitted to the Muxer of the monitoring receiving unit.

The reason why the video OLC message in the uplink call data of the calling party is duplicated to the uplink data of called party is as follows. In terms of audio data, terminals of the calling party and the called party transmit the audio OLC message to tell the opposite party the channel for transmitting. However, in terms of video data, only the terminal of calling party transmits the video OLC message, and the two monitored calls are independent and have no association. Therefore, to exchange the video OLC message between the two data, the VIG has to duplicate the video OLC message in the uplink call data of calling party to the uplink call data of called party.

Figure 1E:
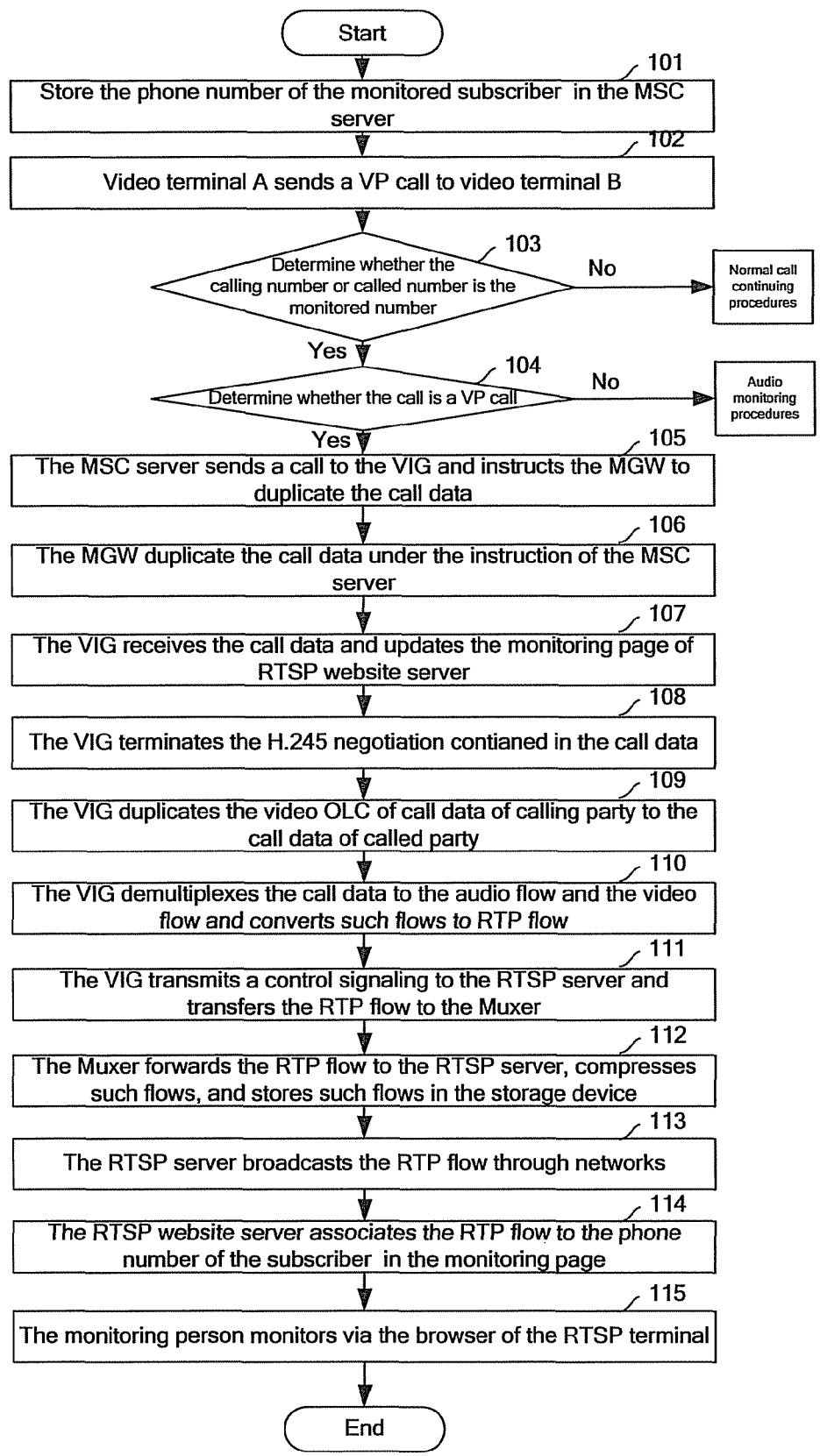
FIG. 1e is a flow chart illustrating a method for monitoring VPs in accordance with the first embodiment of the present invention.
Figure 5:
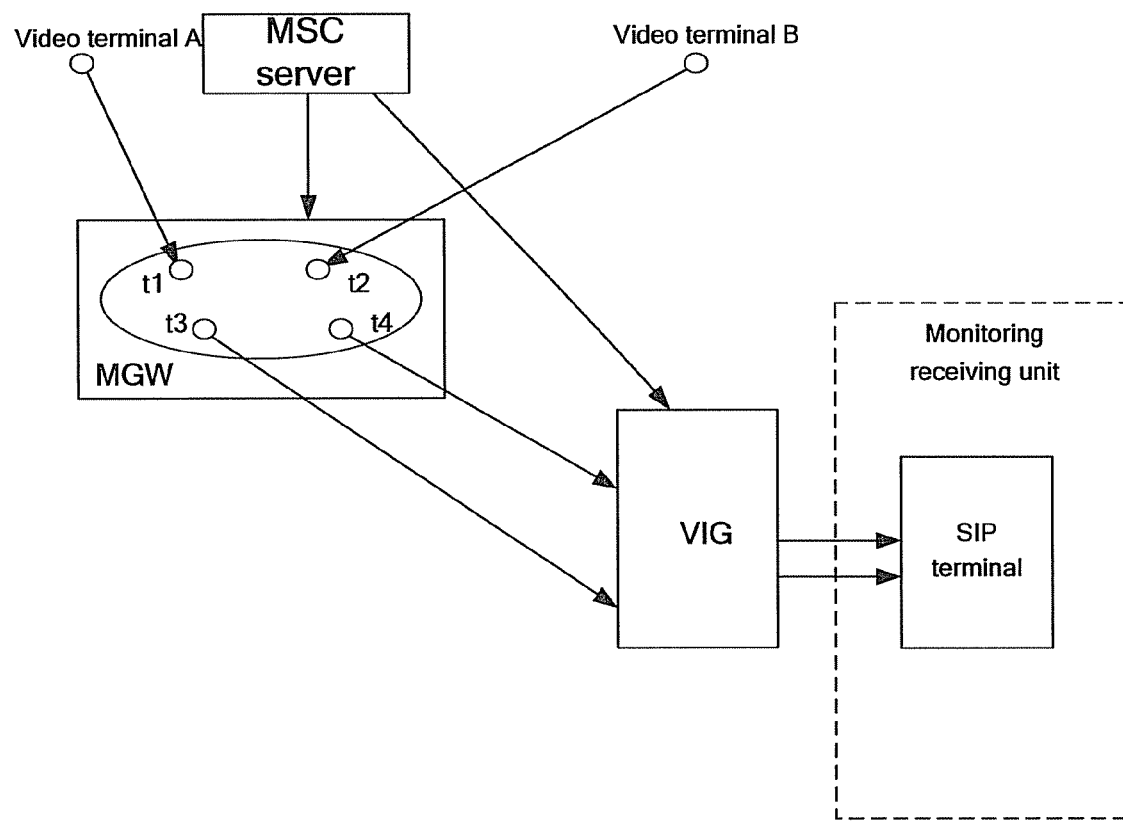
FIG. 5 is a schematic diagram illustrating architecture of a system for monitoring VPs in accordance with a fifth embodiment of the present invention.

Hereinafter, the method for monitoring VPs in accordance with the first embodiment is described in detail, which is based on the system as shown in FIG. 1a. FIG. 5 is a flow chart illustrating the method for monitoring VPs in accordance with the first embodiment of the present invention. As shown in FIG. 1e, in the first embodiment, the process of monitoring VPs in detail includes the following steps.

Step 101: the step of storing the phone number of the monitored subscriber on the MSC server is that: the monitoring centre setting and storing the phone number of the monitored subscriber via a monitoring gateway, or the monitoring centre directly setting and storing the phone number of the monitored subscriber on the MSC server.

Step 102: video terminal A sends a VP to video terminal B.

Step 103: after receiving the call sent by video terminal A to video terminal B, the MSC server extracts the number of the video terminal A and number of the video terminal B and decides whether the number of the video terminal A or the number of the video terminal B is the phone number of the monitored subscriber. If either the number of the video terminal A or the number of the video terminal B is the phone number of the monitored subscriber, proceed to Step 104. If neither the number of the video terminal A nor the number of the video terminal B are the phone number of the monitored subscriber, terminate the current procedure and perform the continuing procedure for a normal call.

Step 104: the MSC server determines whether the number of the video terminal A or the video terminal B includes a 64 k UDI. If the 64 k UDI is included in the number, the call is a VP call, proceed to Step 105. Otherwise, terminate the current procedure and perform the continuing procedure for monitoring an audio call.

Step 105: the MSC server sends a call to the VIG through an integrated service digital network user part (ISDN User Part, ISUP) protocol, telephone user part (TUP) protocol, or primary rate adaptation (PRA) protocol of ISDN. Since the uplink and downlink call data needs to be monitored respectively, the uplink sends a call, that is an IAM message including the number of the calling video terminal, and the downlink sends a call, that is an IAM message including number of the called video terminal through ISUP, PRA or TUP signal to the VIG. The two calls include a control signalling of channel information for receiving call data from the MGW. The MSC server sends the instruction for duplicating the uplink and downlink data of the monitored subscriber through the H.248 signalling to the MGW.

Step 106: under the instruction of MSC server, the MGW uses end point 1 and end point 2 to duplicate the uplink and downlink call data respectively, that is, the uplink call data of the calling party and the uplink call data of the called party. Moreover, the MGW uses end point 3 to duplicate the uplink call data of the calling party of end point 1, uses end point 4 to duplicate the uplink call data of called party of end point 2, transmits the call data of end point 3 and end point 4 to the VIG. For example, the MGW transmits the call data duplicated to the VIG through the H.324M protocol.

Step 107: after receiving the call from the MSC server, the VIG establishes a connection with the MGW to respectively receive the uplink call data of the calling party and the uplink call data of the called party sent by end point 3 and end point 4. Meanwhile, the VIG updates the monitoring interface of the RTSP website server, such as the PORTAL page, and lists the number of the calling video terminal and/or the called video terminal, which is the phone number of the monitored subscriber on the real-time monitoring column of the PORTAL page.

Step 108: the VIG respectively terminates the H.245 negotiation contained in the call data sent by end point 3 and end point 4. Because the monitoring is the duplication of the uplink and downlink call data of the monitored subscriber, the VIG may receive the H.245 negotiation message initiated by the video terminal A and the video terminal B. Because actions of the VIG do not affect actions of the video terminal, after receiving the H.245 negotiation message from video terminal A and video terminal B, the VIG can not return a response message to video terminal A or video terminal B. So the H.245 negotiation supported by the VIG is unidirectional.

Step 109: the VIG duplicates the video OLC message contained in the uplink call data from calling party, i.e. end point 3, to the called party's uplink call data, that is, the call data sent by end point 4. Because, for the audio data, terminals of the both parties will send the audio OLC message to inform the opposite party of the channel for transmitting the audio; for the video data, only the calling party will send the video OLC message, and the monitored two calls are independent and have no association; the VIG needs to exchange the video OLC message between the two data.

Step 110: the VIG respectively de-multiplexes the audio flow and video flow from the H.233 flow bearing the uplink call data of the calling party and the called party according to the audio OLC and video OLC message of the uplink call data of the calling party and the called party, and converts such flows to the RTP flow.

Step 111: the VIG transmits to the RTSP server the control signalling including such information as IP address, port number, and coding/decoding code (CODEC) of RTP flow by means of the announce process of standard RTSP and transmits the converted RTP flow to the Muxer.

Step 112: the Muxer forwards the RTP flow to the RTSP server, meanwhile, compresses the RTP flow, and stores the RTP flow in a storage device after the RTP flow is converted to a file in stream media format, such as RM file or 3GP file. The RTSP server can read the stored file in stream media format as historical data.

Step 113: the RTSP server broadcasts the RTP flow forwarded by the Muxer as a program source through the network according to the control signalling sent by the VIG or broadcasts the data of the file in stream media format stored in the storage device through the network.

Step 114: the RTSP website server receives the RTP flow broadcasted by the RTSP server and associates the RTP flow with the phone number of the monitored subscriber displayed on the PORTAL page.

Step 115: the monitoring person accesses the PORTAL page of RSTP website server through a browser of RTSP terminal, click the phone number of the monitored subscriber and perform monitoring.

A Second Embodiment

Figure 2A:
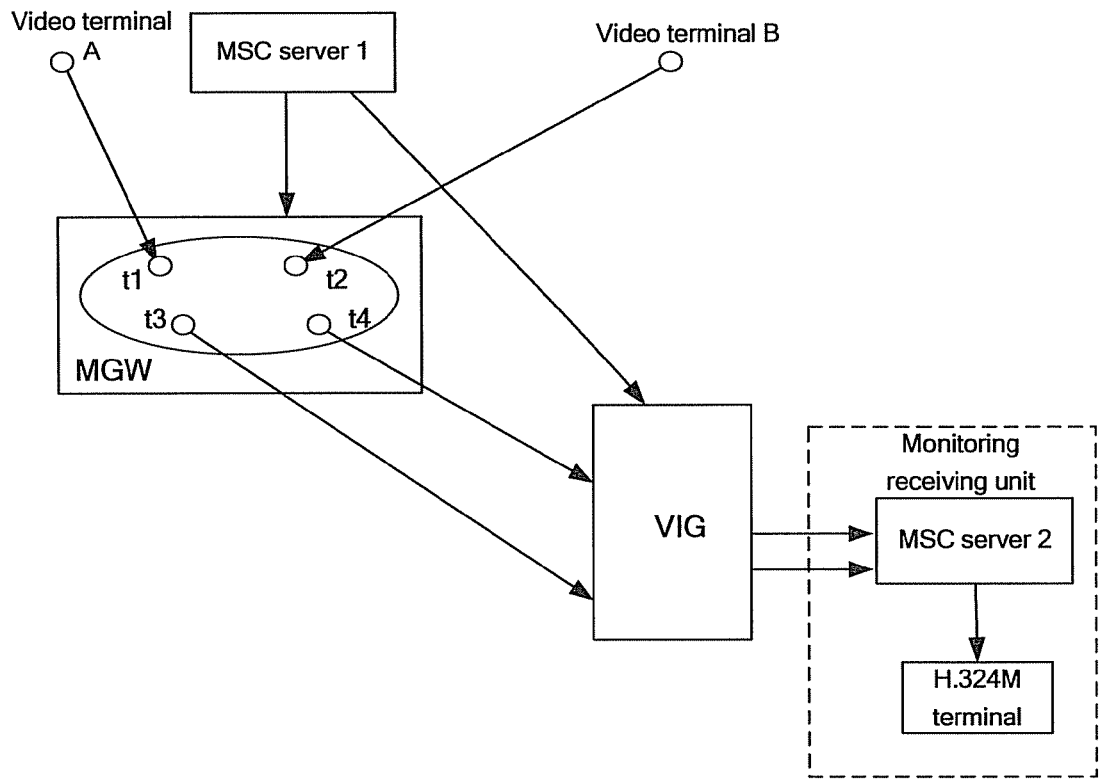
FIG. 2a is a schematic diagram illustrating architecture of a system for monitoring VPs in accordance with a second embodiment of the present invention.

FIG. 2a is a schematic diagram illustrating the architecture of the system for monitoring VPs in accordance with the second embodiment of the present invention. As shown in FIG. 2a, the system for monitoring VPs includes a video terminal A, a video terminal B, an MSC server 1, an MGW, a VIG, an MSC server 2, and an H.324M terminal. Functions of the terminal A, the terminal B, the MSC server 1, and the MGW are respectively the same as the functions illustrated in the first embodiment. The function of VIG is somewhat different from the function of VIG illustrated in the first embodiment. Moreover, the MSC server 2 and the H.324M terminal serve as the monitoring receiving unit in this embodiment. The MSC server 1 is the MSC server of the monitored side, while the MSC server 2 is the MSC server of the monitoring side. It should be understood that the MSC server 1 and the MSC server 2 may be the same MSC server. Hereinafter, the differences between this embodiment and the first embodiment are illustrated as follows.

(1) the VIG establishes a connection with the MGW according to the call sent by the MSC server 1, processes the call data from the MGW on the bearer plane, de-multiplexes the audio flow and video flow. The audio flow and video flow are TDM flows and need no protocol conversion, and the flows are directly sent to the MSC server 2 where the H.324M terminal belongs. On the control plane, the VIG sends to the MSC server 2 to which the H.324M terminal belongs a control signalling including information of TDM flow address and encoding/decoding information through the RTSP protocol.

(2) the MSC server 2 is the MSC server where the H.324M terminal belongs and can send the TDM flow transmitted from the VIG to the H.324M terminal.

(3) the H.324M is a 3G mobile phone. The H.324M receives the TDM flow from the VIG and then plays the audio and video data.

In this embodiment, the parts associated with video monitoring in the MSC server 1 and the MGW are the same as those illustrated in the first embodiment. Therefore, there is no more description.

Figure 2B:
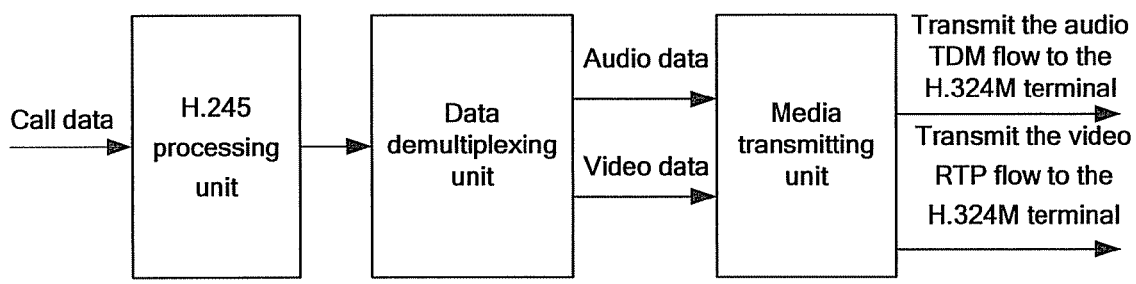
FIG. 2b is a schematic diagram illustrating a structure of the VIG in accordance with the second embodiment of the present invention.

As shown in FIG. 2b, in this embodiment, the part associated with video monitoring of the VIG includes an H.245 processing unit, a data de-multiplexing unit, and a media transmitting unit. The functions of H.245 processing unit and data de-multiplexing unit are the same as the functions illustrated in the first embodiment, therefore there is no more description. The media transmitting unit converts the audio flow and video flow to the TDM flow and transmits the TDM flow to the monitoring receiving unit in the first embodiment, while in this embodiment, the TDM flow is transmitted to the MSC server 2 and the MSC server 2 transmits the TDM flow to the H.324 terminal.

In this embodiment, a mobile terminal can implement the monitoring. The monitoring person can use a mobile phone to monitor without staying at a fixed monitoring place.

A Third Embodiment

Figure 3:
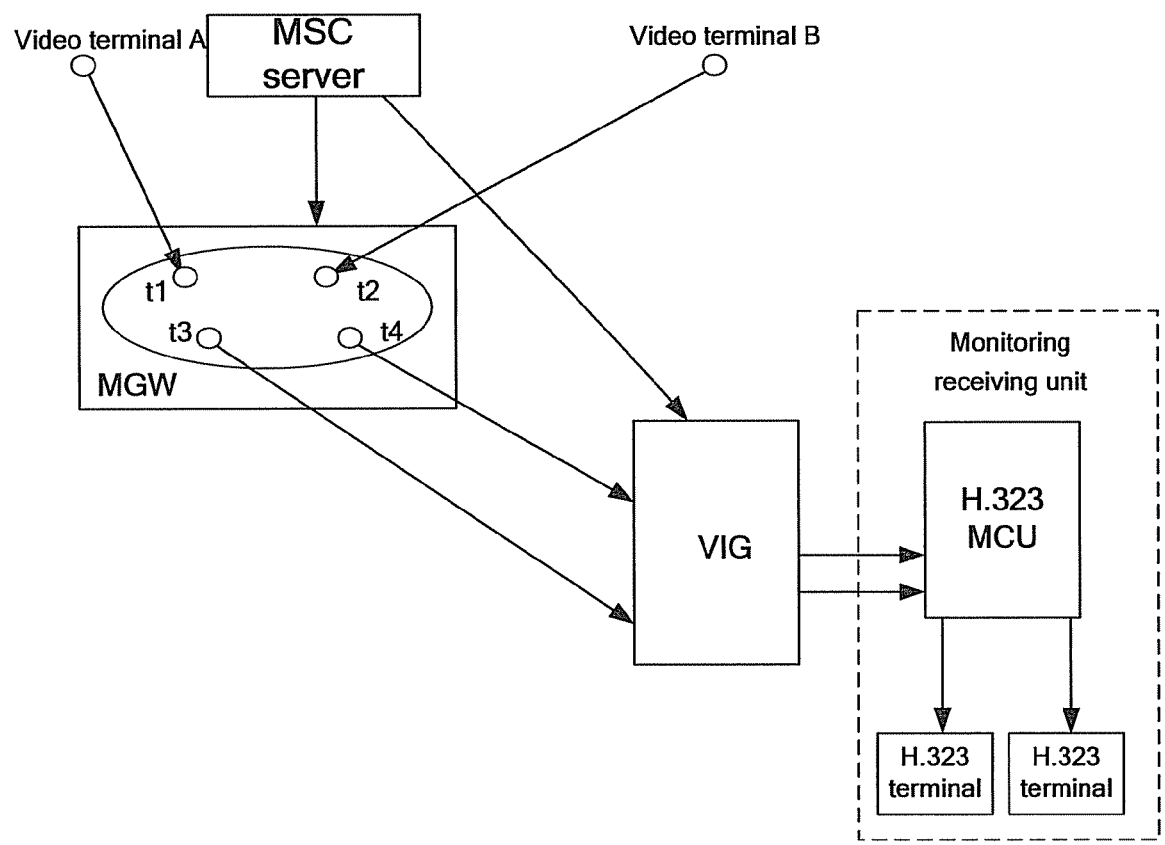
FIG. 3 is a schematic diagram illustrating architecture of a system for monitoring VPs in accordance with a third embodiment of the present invention.

FIG. 3 is a schematic diagram illustrating the architecture of the system for monitoring VPs in accordance with the third embodiment of the present invention. As shown in FIG. 3, the system for monitoring VPs includes a video terminal A, a video terminal B, an MSC server, an MGW, a VIG, an H.323 multipoint control unit (MCU), and at least one H.323 terminal. Functions of the terminal A, the terminal B, the MSC server, and the MGW are respectively the same as those illustrated in the first embodiment. The function of VIG is somewhat different from the function of VIG illustrated in the first embodiment. Moreover, the H.323 MCU and H.323 terminal serve as the monitoring receiving unit in this embodiment. Hereinafter, the differences between this embodiment and the first embodiment are illustrated as follows.

(1) the VIG establishes a connection with the MGW according to the call sent by the MSC server, processes the call data from the MGW on the bearer plane, de-multiplexes the audio and video data, converts the audio flow and video flow to an RTP flow, and transmits the RTP flow to the H.323 MCU. On the control plane, the VIG transmits a control signalling including information of RTP flow address and encoding/decoding information to the H.323 MCU.

(2) the H.323 MCU receives the RTP flow sent by the VIG and transmits audio and video data to at least one H.323 terminal.

(3) the at least one H.323 terminal plays the audio and video data.

In this embodiment, the parts associated with video monitoring of the MSC server and the MGW are the same as those illustrated in the first embodiment. Therefore, there is no more description.

In this embodiment, the part associated with video monitoring in the VIG includes an H.245 processing unit, a data de-multiplexing unit, and a media transmitting unit. The functions of H.245 processing unit and data de-multiplexing unit are the same as those illustrated in the first embodiment, therefore there is no more description. The media transmitting unit converts the audio flow and video flow to the RTP flow and transmits the RTP flow to the monitoring receiving unit in the first embodiment. While in this embodiment, the RTP flow is transmitted to the H.323 MCU. In this embodiment, the monitoring can be implemented by multiple H.323 terminals simultaneously.

A Fourth Embodiment

Figure 4:
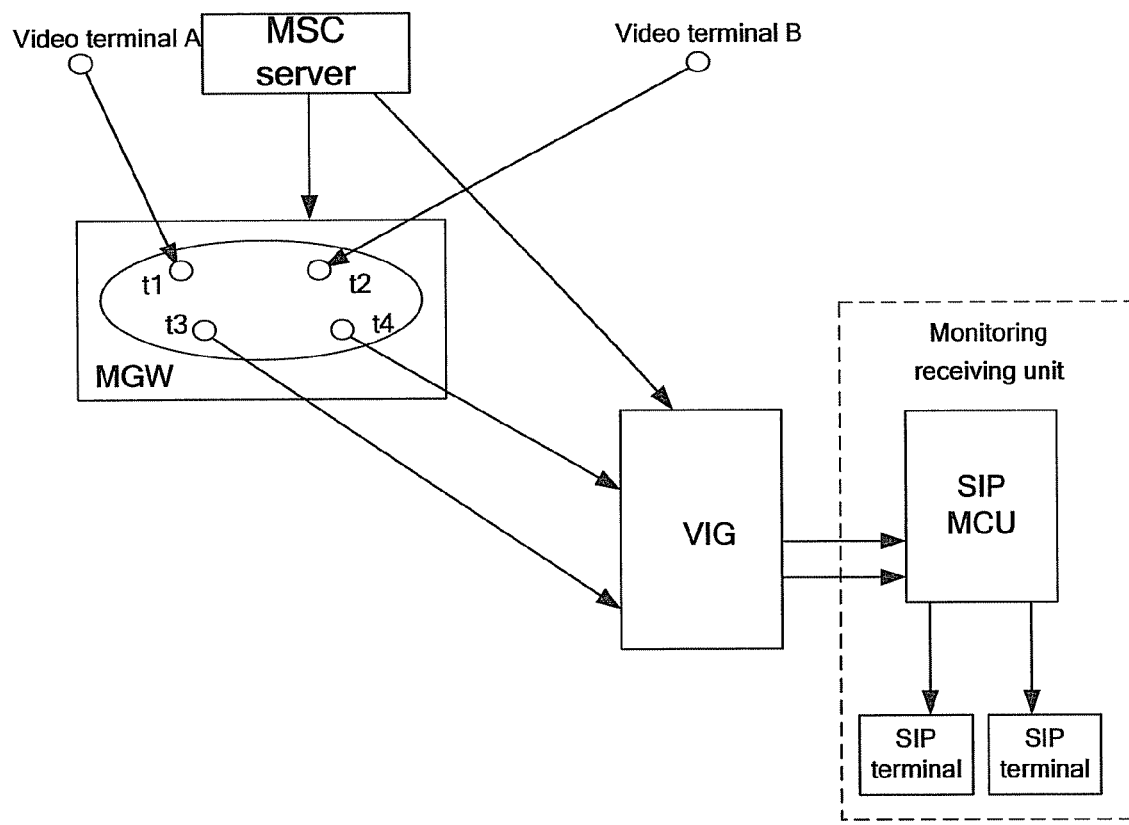
FIG. 4 is a schematic diagram illustrating an architecture of a system for monitoring VPs in accordance with a fourth embodiment of the present invention.

FIG. 4 is a schematic diagram illustrating the architecture of the system for monitoring VPs in accordance with the fourth embodiment of the present invention. As shown in FIG. 4, the system for monitoring VPs includes a video terminal A, a video terminal B, an MSC server, an MGW, a VIG, a session initiation protocol (SIP) MCU, and at least one SIP terminal. Functions of the terminal A, the terminal B, the MSC server, and the MGW are respectively the same as those illustrated in the first embodiment. The function of the VIG is somewhat different from the function of the VIG illustrated in the first embodiment. Moreover, the SIP MCU and the SIP terminal serve as the monitoring receiving unit in this embodiment. Hereinafter, the difference between this embodiment and the first embodiment is illustrated as follows.

(1) the VIG has SIP function. The VIG establishes a connection with the MGW according to the call sent by the MSC server, processes the call data from the MGW on the bearer plane, de-multiplexes the audio and video data, converts the two flows into the RTP flow, and transmits the RTP flow to the SIP MCU. On the control plane, the VIG transmits to the SIP MCU a control signalling including information of RTP flow address and encoding/decoding information.

(2) the SIP MCU receives the RTP flow sent by the VIG and transmits the audio and video data to the SIP terminal.

(3) the SIP terminal plays the audio and video data.

In this embodiment, the parts associated with video monitoring in the MSC server and the MGW are the same as those illustrated in the first embodiment. Therefore, there is no more description.

In this embodiment, the parts associated with video monitoring in the VIG include an H.245 processing unit, a data de-multiplexing unit, and a media transmitting unit. The functions of H.245 processing unit and data de-multiplexing unit are the same as those illustrated in the first embodiment, therefore there is no more description. The media transmitting unit converts the audio flow and video flow to the RTP flow to transmit the RTP flow to the monitoring receiving unit in the first embodiment, while in this embodiment, the RTP flow is transmitted to SIP MCU. In this embodiment, the monitoring can be implemented by multiple SIP terminals simultaneously.

A Fifth Embodiment

FIG. 5 is a schematic diagram illustrating the architecture of the system for monitoring VPs in accordance with the fifth embodiment of the present invention. As shown in FIG. 5, the system for monitoring VPs includes a video terminal A, a video terminal B, an MSC, an MGW, a VIG, and an SIP terminal. Functions of the terminal A, the terminal B, the MSC, and the MGW are respectively the same as those illustrated by the first embodiment. The function of VIG is somewhat different from the function of VIG illustrated in the first embodiment. Moreover, the SIP terminal serves as the monitoring receiving unit of this embodiment. Hereinafter, the differences between this embodiment and the first embodiment are illustrated as follows.

(1) the VIG has SIP function. The VIG establishes a connection with the MGW according to the call sent by the MSC, processes the call data from the MGW on the bearer plane, de-multiplexes the data into the audio flow and the video flow, converts the two flows to the RTP flow, and transmits the RTP flow to the SIP terminal. On the control plane, the VIG transmits a control signalling including information of RTP flow address and encoding/decoding information to the SIP terminal.

(2) the SIP terminal plays the audio and video flow.

In this embodiment, the parts associated with video monitoring in MSC and MGW are the same as those illustrated in the first embodiment. Therefore, there is no more description.

In this embodiment, the part associated with video monitoring in the VIG includes an H.245 processing unit, a data de-multiplexing unit, and a media transmitting unit. The functions of the H.245 processing unit and data de-multiplexing unit are the same as the functions illustrated in the first embodiment, therefore there is no more description. The media transmitting unit converts the audio flow and video flow to the RTP flow and transmits the RTP flow to the monitoring receiving unit in the first embodiment, while in this embodiment, the RTP flow is transmitted to the SIP terminal.

The embodiments of the present invention can be modified appropriately during specific implementation to meet the detailed requirements of specific cases. It is thereby understood that the specific embodiments described in this disclosure are illustrative rather than limiting the scope of the present invention.

What is claimed is:

1. A system for monitoring a Video Phone (VP) service, applied for monitoring a video communication between a calling video terminal and a called video terminal, comprising a Mobile Switching Centre (MSC) server, a Media Gateway (MGW), a Video Inter-working Gateway (VIG), and a monitoring receiving unit;

wherein the MSC server sends a call to the VIG upon the calling video terminal initiating a VP call to the called video terminal and instructs the MGW to duplicate call data of the calling video terminal and the called video terminal;

the MGW duplicates the call data of the calling video terminal and the called video terminal, respectively, and transmits the call data to the VIG;

the VIG receives the call sent by the MSC server, establishes a connection with the MGW, and receives the call data; the VIG de-multiplexes the call data into an audio flow and a video flow, and transmits the audio flow, the video flow, and a control signaling to the monitoring receiving unit;

the monitoring receiving unit plays the audio flow and video flow according to the control signaling;

wherein the monitoring receiving unit comprises a real time streaming protocol (RTSP) server, an RTSP website server, and an RTSP terminal;

upon receiving the call sent by the MSC server, the VIG adds a number of the calling video terminal and a number of the called video terminal to a monitoring interface of the RTSP website server;

the VIG converts the call data to an RTP flow, and transmits the RTP flow to the RTSP server; the RTSP server broadcasts the RTP flow to the RTSP website server through a network;

the RTSP website server receives the RTP flow, and associates the RTP flow with the number of the calling video terminal and the number of the called video terminal displayed on the monitoring interface; and the RTSP terminal plays the RTP flow via accessing the monitoring interface of the RTSP website server.

2. The system of claim 1, further comprising a Muxer;
wherein the Muxer forwards the RTP flow sent by the VIG to the RTSP server.

3. The system of claim 2, further comprising a storage device;
wherein the Muxer compresses the RTP flow sent by the VIG, and converts the RTP flow compressed by the Muxer to a file in stream media format, and stores the file in the storage device;
the storage device transmits the file in stream media format to the RTSP server; the RTSP server broadcasts the file in stream media format through network after the file is decompressed.

4. The system of claim 1, wherein the call sent by the MSC server to the VIG is born by an Integrated Service Digital Network (ISDN) User Part (ISUP) protocol, a Telephone User Part (TUP) protocol, or a Primary Rate Adaptation (PRA) protocol of ISDN.

5. The system of claim 1, wherein the control signaling sent by the VIG to the monitoring receiving unit is born by an RTSP protocol, the control signaling comprising addresses of the audio flow and the video flow, a port number, and encoding/decoding information.

6. A method for monitoring a Video Phone (VP) service, applied for monitoring a video communication between a calling video terminal and a called video terminal, comprising:
a Mobile Switching Centre (MSC) server instructing a Media GateWay (MGW) to duplicate call data of the calling video terminal and the called video terminal;
the MGW duplicating the call data of the calling video terminal and the called video terminal, respectively, and transmitting the call data to a Video Inter-working Gateway (VIG);
the VIG receiving the call sent by the MSC server, establishing a connection with the MGW, receiving the call data, de-multiplexing the call data into an audio flow and a video flow, transmitting the audio flow, the video flow, and a control signaling to a monitoring receiving unit comprising a real time streaming protocol (RTSP) server, an RTSP website server, and an RTSP terminal, wherein upon receiving the call sent by the MSC server, the VIG adds a number of the calling video terminal and a number of the called video terminal to a monitoring interface of the RTSP website server; the VIG converts the call data to an RTP flow, and transmits the RTP flow to the RTSP server; the RTSP server broadcasts the RTP flow to the RTSP website server through a network; the RTSP website server receives the RTP flow, and associates the RTP flow with the number of the calling video terminal and the number of the called video terminal displayed on the monitoring interface; and the RTSP terminal plays the RTP flow via accessing the monitoring interface of the RTSP website server.

7. A system for monitoring a Video Phone (VP) service, applied for monitoring a video communication between a calling video terminal and a called video terminal, comprising a Mobile Switching Centre (MSC) server, a Media GateWay (MGW), a Video Inter-working Gateway (VIG), and a monitoring receiving unit;
wherein the MSC server sends a call to the VIG upon the calling video terminal initiating a VP call to the called video terminal and instructs the MGW to duplicate call data of the calling video terminal and the called video terminal;
the MGW duplicates the call data of the calling video terminal and the called video terminal, respectively, and transmits the call data to the VIG;
the VIG receives the call sent by the MSC server, establishes a connection with the MGW, and receives the call data; the VIG de-multiplexes the call data into an audio flow and a video flow, and transmits the audio flow, the video flow, and a control signaling to the monitoring receiving unit;
the monitoring receiving unit plays the audio flow and video flow according to the control signaling;
wherein the system further comprises a storage device and a Muxer, the Muxer compresses an RTP flow sent by the VIG, and converts the RTP flow compressed by the Muxer to a file in a stream media format, and stores the file in the storage device;
the storage device transmits the file in the stream media format to a real time streaming protocol (RTSP) server; the RTSP server broadcasts the file in the stream media format through a network after the file is decompressed.

* * * * *